US008032888B2

(12) United States Patent
Vengerov et al.

(10) Patent No.: US 8,032,888 B2
(45) Date of Patent: Oct. 4, 2011

(54) METHOD AND SYSTEM FOR SCHEDULING A THREAD IN A MULTIPROCESSOR SYSTEM

(75) Inventors: David Vengerov, Sunnyvale, CA (US); Savvas Gitzenis, Athens (GR); Declan J. Murphy, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1387 days.

(21) Appl. No.: 11/581,917

(22) Filed: Oct. 17, 2006

(65) Prior Publication Data

US 2011/0004882 A1 Jan. 6, 2011

(51) Int. Cl.
*G06F 9/46* (2006.01)
(52) U.S. Cl. .................................. 718/102; 718/100
(58) Field of Classification Search ........................ None
See application file for complete search history.

(56) References Cited

U.S. PATENT DOCUMENTS

| 5,870,604 | A | * | 2/1999 | Yamagishi | 718/105 |
| 5,991,792 | A | * | 11/1999 | Nageswaran | 718/102 |
| 7,421,536 | B2 | * | 9/2008 | Omura | 711/113 |

OTHER PUBLICATIONS

Byde, A. et al.; "Market-Based Resource Allocation for Utility Data Centers"; HP Technical Report HPL-2003-188; hpl.hp.com/techreports/2003/HPL-2003-188.pdf; Sep. 9, 2003; 16 pages.
Kaelbling, L.P. et al.; "Reinforcement Learning: A Survey"; Journal of Artificial Intelligence Research; vol. 4, 1996; pp. 237-285; 49 pages.
Jaakkola, T. et al.; "On the Convergence of Stochastic Iterative Dynamic Programming Algorithms"; Neural Computation; vol. 6, No. 6, 1994; pp. 1185-1201; 32 pages.
Wang, Li-Xin; "Fuzzy Systems Are Universal Approximators"; Proceedings of the IEEE International Conference on Fuzzy Systems (FUZZ-IEEE '92), 1992, pp. 1163-1170; 8 pages.
"Solaris Containers: Server Virtualization and Manageability"; Sun Microsystems, Inc., A Technical White Paper, Sep. 2004; 23 pages.
Tesauro, G. et al.; "Utility-Function-Driven Resource Allocation in Automomic Systems"; Proceedings of the 2nd IEEE International Conference on Autonomic Computing (ICAC-05), 2005; 2 pages.

(Continued)

*Primary Examiner* — Emerson Puente
*Assistant Examiner* — Camquy Truong
(74) *Attorney, Agent, or Firm* — Osha • Liang LLP

(57) ABSTRACT

A method for scheduling a thread on a plurality of processors that includes obtaining a first state of a first processor in the plurality of processors and a second state of a second processor in the plurality of processors, wherein the thread is last executed on the first processor, and wherein the first state of the first processor includes the state of a cache of the first processor, obtaining a first estimated instruction rate to execute the thread on the first processor using an estimated instruction rate function and the first state, obtaining a first estimated global throughput for executing the thread on the first processor using the first estimated instruction rate and the second state, obtaining a second estimated global throughput for executing the thread on the second processor using the second state, comparing the first estimated global throughput with the second estimated global throughput to obtain a comparison result, and executing the thread, based on the comparison result, on one selected from a group consisting of the first processor and the second processor, wherein the thread performs an operation on one of the plurality of processors.

18 Claims, 5 Drawing Sheets

OTHER PUBLICATIONS

Vengerov, D. et al.; "A Reinforcement Learning Framework for Dynamic Resource Allocation: First Results"; Proceedings of the 2nd IEEE International Conference on Autonomic Computing (ICAC-05), 2005; 2 pages.

Vengerov, D.; "A Reinforcement Learning Approach to Dynamic Resource Allocation"; SMLI TR-2005-148, Sep. 2005; 15 pages.

Vengerov, D.; "A Fuzzy Reinforcement Learning Approach to Power Control in Wireless Transmitters"; IEEE Transactions on Systems, Man, and Cybernetics B., vol. 35, Issue 4, Aug. 2005; 11 pages.

Barcelo, F. et al.; "Performance Evaluation of Public Access Mobile Radio (PAMR) Systems with Priority Calls"; Proceedings of the 11th IEEE International Symposium on Personal, Indoor and Mobile Radio Communications; Sep. 18-21, 2000; 5 pages.

Walsh, W. E. et al.; "Utility Functions in Autonomic Systems"; Proceedings of International Conference on Autonomic Computing; 2004; research.ibm.com/people/w/wwalsh1/Papers/icac04NeDAR.pdf; 8 pages.

Tsitsiklis, J.N. et al.; "An Analysis of Temporal-Difference Learning with Function Approximation"; IEEE Transactions on Automatic Control; vol. 42, No. 5, May 1997, pp. 674-690; 17 pages.

* cited by examiner

METHOD AND SYSTEM FOR SCHEDULING A THREAD IN A MULTIPROCESSOR SYSTEM

STATEMENT REGARDING FEDERALLY SPONSORED RESEARCH OR DEVELOPMENT

The present invention was made with the support of the government of the United States under contract NBCH3039002 awarded by the Defense Advanced Research Projects Administration. The United States government may have certain rights in the present invention.

BACKGROUND

A typical computer system includes hardware (e.g., processor(s), memory, etc.) and software (e.g., operating system, user-level applications, etc.). The software is often executed as one or more threads. A thread corresponds to a sequence of instructions. A single processor may execute multiple threads concurrently. For example, the processor may begin executing a first thread, halt execution of the first thread, begin execution of a second thread, and then switch back to the first thread. Thus, by switching between threads, multiple threads may appear as if executing simultaneously. When executing a thread, an instruction may be executed that requires halting execution in order for an event, such as obtaining data from peripheral storage. While waiting for the data, the processor may switch to another thread to execute.

To further complicate the execution of the software on the hardware, in a multiprocessor system, multiple processors execute threads in parallel. Often, executing threads are shared amongst processors rather than dedicated to a single processor. For example, a thread may be first executed by processor X, and then switched to being executed by processor Y. Each processor in a multiprocessor system typically has a group of threads that are assigned to the processor. Specifically, a processor switches between the threads assigned to the processor. Further, threads may be reassigned from one processor to another processor by a scheduler.

When a scheduler determines which processor to assign a thread to, the scheduler often identifies the total number of threads assigned to each processor. In some cases, the thread is assigned to the processor with the lowest total number of threads assigned to the processor. Thus, the scheduler maintains load balancing of the threads across the processors.

SUMMARY

In general, in one aspect, the invention relates to a method for scheduling a thread on a plurality of processors that includes obtaining a first state of a first processor in the plurality of processors and a second state of a second processor in the plurality of processors, wherein the thread is last executed on the first processor, and wherein the first state of the first processor includes the state of a cache of the first processor, obtaining a first estimated instruction rate to execute the thread on the first processor using an estimated instruction rate function and the first state, obtaining a first estimated global throughput for executing the thread on the first processor using the first estimated instruction rate and the second state, obtaining a second estimated global throughput for executing the thread on the second processor using the second state, comparing the first estimated global throughput with the second estimated global throughput to obtain a comparison result, and executing the thread, based on the comparison result, on one selected from a group consisting of the first processor and the second processor, wherein the thread performs an operation on one of the plurality of processors.

In general, in one aspect, the invention relates to a system for scheduling a thread that includes a plurality of processors for executing the thread, and an scheduler configured to obtain a first state of a first processor in the plurality of processors and a second state of the second processor in the plurality of processors, wherein the thread is last executed on the first processor, and wherein the first state of the first processor includes the state of a cache of the first processor, obtain a first estimated instruction rate to execute the thread on the first processor using an estimated instruction rate function and the first state, obtain a first estimated global throughput for executing the thread on the first processor using the first estimated instruction rate and the second state, obtain a second estimated global throughput for executing the thread on the second processor using the second state, compare the first estimated global throughput with the second estimated global throughput to obtain a comparison result, and execute the thread, based on the comparison result, on one selected from the group consisting of the first processor and the second processor, wherein the thread performs an operation on one of the plurality of processors.

In general, in one aspect, the invention relates to a distributed computer system that includes a plurality of nodes for performing obtaining a first state of a first processor in the plurality of processors and a second state of a second processor in the plurality of processors, wherein the thread is last executed on the first processor, and wherein the first state of the first processor includes the state of a cache of the first processor, obtaining a first estimated instruction rate to execute the thread on the first processor using an estimated instruction rate function and the first state, obtaining a first estimated global throughput for executing the thread on the first processor using the first estimated instruction rate and the second state, obtaining a second estimated global throughput for executing the thread on the second processor using the second state, comparing the first estimated global throughput with the second estimated global throughput to obtain a comparison result, and executing the thread, based on the comparison result, on one selected from a group consisting of the first processor and the second processor, wherein the thread performs an operation on one of the plurality of processors.

Other aspects of the invention will be apparent from the following description and the appended claims.

DETAILED DESCRIPTION

Figure 1:
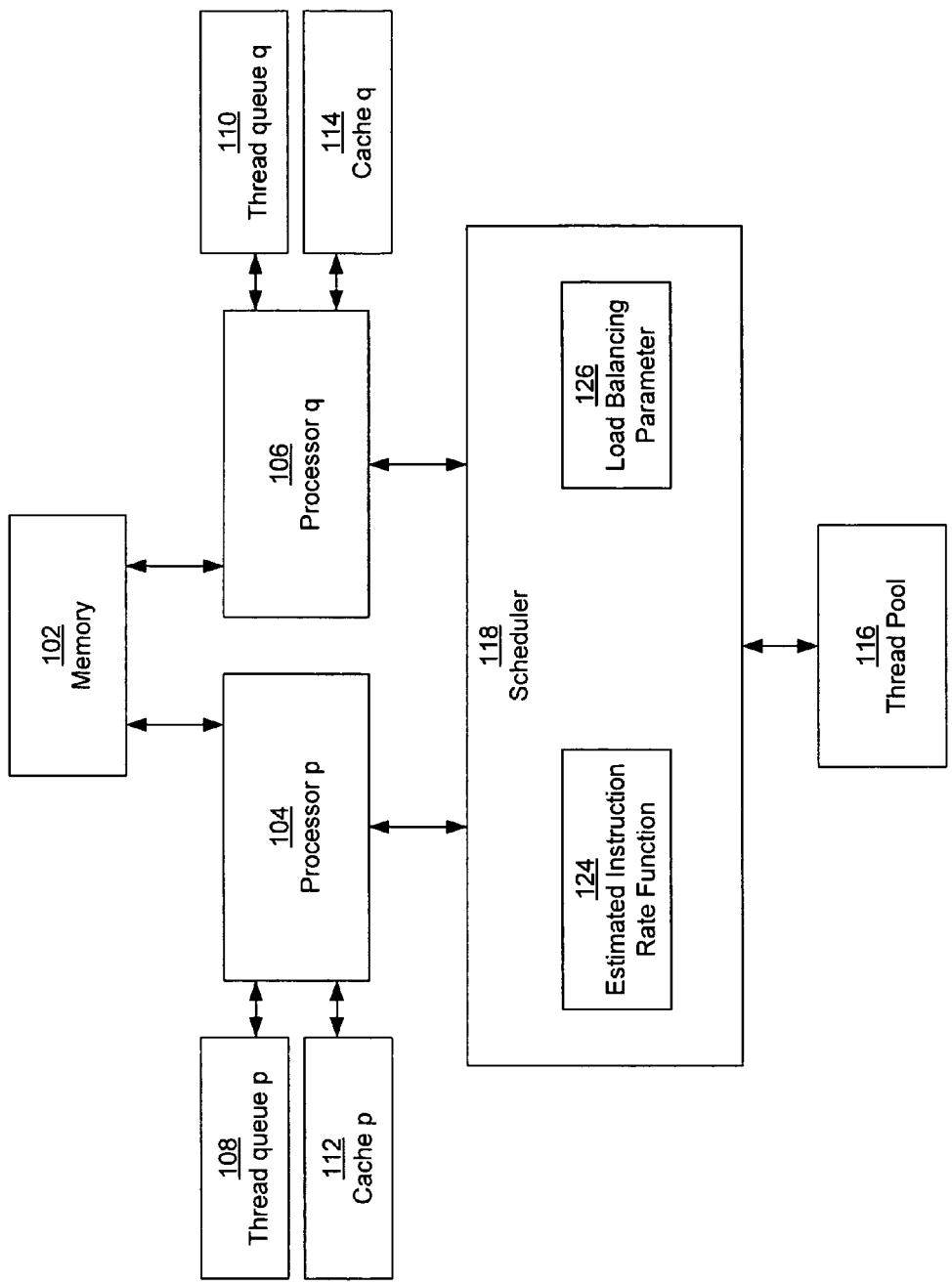
FIG. 1 shows a schematic diagram of a system for scheduling a thread in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for scheduling threads to execute on a multiprocessor system. Specifically, for each processor that may execute the thread, the global instruction rate is estimated. The thread is scheduled to execute on a processor according to the highest estimated global throughput. Moreover, the estimated total global throughput incorporates a performance gain achieved by executing a thread on the same processor in which the thread previously executed. Specifically, when executing a thread on the same processor, storage related instructions (e.g., load, store, etc.) often only require accessing cache rather than memory.

FIG. 1 shows a schematic diagram of a system for scheduling a thread in accordance with one or more embodiments of the invention. As shown in FIG. 1, the system includes memory (102), processors (e.g., processor p (104), processor q (106)), thread queues (e.g., thread queue p (108), thread queue q (110)), cache (e.g., cache p (112), cache q (114)), a thread pool (116), and a scheduler (118). Each of these components is described below.

In one or more embodiments of the invention, memory (102) corresponds to a primary and/or secondary storage unit, such as network storage, hard disk drives, removable drives, flash memory, or any other storage system or combination thereof. Memory (102) is connected to processors (e.g., processor p (104), processor q (106)).

A processor (e.g., processor p (104), processor q (106)) corresponds to any logical unit that includes functionality to execute threads. A thread corresponds to a sequence of instructions in execution. An attribute of a thread is the thread state, such as "new", "executing", "waiting", "terminated", etc. A thread is "new" when the thread has not been previously executed. A thread is "executing" when a processor (e.g., processor p (104), processor q (106)) is actively executing the instructions of the thread. A thread is "waiting" when the execution of the thread is temporarily halted while waiting, such as for a resource (e.g., a processor, memory, etc.), another thread, or any other entity. A thread is "terminated" when the execution of the thread has ended.

Threads that are assigned to a specific processor (e.g., processor p (104), processor q (106)) wait for the processor in a thread queue (e.g., thread queue p (108), thread queue q (110)). Specifically, a thread queue (e.g., thread queue p (108), thread queue q (110)) corresponds to a waiting area, such as a data structure, for threads that are assigned to be executed by a particular processor. More specifically, each thread in a processor's thread queue (e.g., thread queue p (108), thread queue q (110)) is executed in turn by the processor (e.g., processor p (104), processor q (106)). Conversely, a processor (e.g., processor p (104), processor q (106)) switches between the threads that are in the processor's thread queue (e.g., thread queue p (108), thread queue q (110)).

In addition to the thread queue (e.g., thread queue p (108), thread queue q (110)), each processor (e.g., processor p (104), processor q (106)) is also connected to a cache (e.g., cache p (112), cache q (114)). A cache (e.g., cache p (112), cache q (114)) corresponds to storage (e.g., L1 cache, L2 cache, etc.) that may be quickly accessed by the processor (e.g., processor p (104), processor q (106)). Specifically, the amount of time to access cache (e.g., cache p (112), cache q (114)) is typically less than the amount of time to access memory (102). Accordingly, rather than reading and modifying memory (102) directly, the processors use the cache (e.g., cache p (112), cache q (114)) as an intermediary. Data stored in a location of cache (e.g., cache p (112), cache q (114)) has a corresponding location in memory (102).

Accordingly, updates to a location of cache (e.g., cache p (112), cache q (114)) must also be performed in memory (102) in accordance with one or more embodiments of the invention. A location of cache (e.g., cache p (112), cache q (114)) is clean when the data in the location of cache and the corresponding location of memory are synchronized. Conversely, a location of cache is dirty (e.g., cache p (112), cache q (114)) when data in the location of cache is modified without the equivalent modifications transmitted to the corresponding location in memory (102). When the cache (e.g., cache p (112), cache q (114)) is full and new data must be stored in the cache (e.g., cache p (112), cache q (114)), then previous data at a location of cache (e.g., cache p (112), cache q (114)) is replaced with the new data and any modifications to the previous data are transmitted to memory (102).

Because multiple threads are executed by a single processor, the multiple threads typically share the same cache for the single processor. Further, an executing thread may replace data in location(s) of cache regardless of whether the data is for a different thread. Specifically, the currently executing thread of a processor (e.g., processor p (104), processor q (106)) may replace data in a cache of threads that are waiting if required by the cache. Thus, a cache has a state. The state of the cache identifies the status of the cache at a particular moment in time. The state of the cache may include state variables that describe the amount of cache used by currently executing threads on a processor, the amount of cache not used by currently executing threads, the amount of time or storage related instructions that have elapsed since the thread was last executed, etc.

The state of the processor identifies the status of the processor (e.g., processor p (104), processor q (106)) at a particular moment in time in accordance with one or more embodiments of the invention. A processor state includes the state of the cache (discussed above) and the state of the thread queue. In one or more embodiments of the invention, the state of the thread queue may include state variables to describe the number of threads in the thread queue (e.g., thread queue p (108), thread queue q (110))) of a processor (e.g., processor p (104), processor q (106)), the number of new threads in the thread queue (e.g., thread queue p (108), thread queue q (110))) of a processor (e.g., processor p (104), processor q (106)), the execution rate of the processor (i.e., number of instructions executed divided by the time that has elapsed), the execution rate of useful instructions (i.e., instructions not related to memory accesses), and/or any other performance statistics about the processor (e.g., processor p (104), processor q (106)).

Continuing with FIG. 1, a thread pool (116) corresponds to a collection of threads that are not assigned to a processor (e.g., processor p (104), processor q (106)) in accordance with one or more embodiments of the invention. Threads in the thread pool (116) may be new threads or waiting threads. Further, the thread pool (116) may also include threads that are currently assigned (i.e., threads in a processor's thread queue (e.g., thread queue p (108), thread queue q (110))). Specifically, threads that are currently assigned may be reassigned to a different processor (e.g., processor p (104), processor q (106)).

A scheduler (118) is interposed between the thread pool (116) and the processors (e.g., processor p (104), processor q (106)). A scheduler (118) includes functionality to assign threads to processors in a manner so as to maximize the global throughput (i.e., number of instructions processed by all processors in a particular amount of time). Specifically, a scheduler (118) includes functionality to schedule a thread on a processor accordingly to the state of the processors. A scheduler (118) includes an estimated instruction rate function (124) and a load balancing parameter (126) in accordance with one or more embodiments of the invention.

An estimated instruction rate function (124) corresponds to a logical entity that includes functionality to approximate the instruction rate of a processor (e.g., processor p (104), processor q (106)) based on the state of the processor (e.g., state of the cache, state of the thread queue) and whether additional threads are to be executed by the processor (e.g., processor p (104), processor q (106)). The estimated instruction rate function (124) may correspond to the summation of the state variables multiplied by a parameter describing the weight of the state variable.

A load balancing parameter (126) corresponds to a parameter that identifies an expected reward for distributing the threads evenly across the processors (e.g., processor p (104), processor q (106)). Specifically, the load balance parameter (126) allows for an adjustment to the estimated global throughput to compensate for executing the thread on the same processor (e.g., processor p (104), processor q (106)). Further, the load balancing parameter (126) may correspond to a constant or to a function. If the load balancing parameter (126) corresponds to a function, then the state variable used to calculate the load balancing parameter (126) may include the number of threads in the thread queue of each processor (e.g., processor p (104), processor q (106)) or the difference between number of threads in each processor (e.g., processor p (104), processor q (106)).

In one or more embodiments of the invention, the estimated rate function (124) and/or load balancing parameter (126) is learned using reinforcement learning. Reinforcement learning corresponds to a technique in which a function is approximated and periodically updated. Specifically, an initial function is created. The initial function is then used to perform an action. Based on observed results of the action, the initial function is updated and used to perform another action.

Figure 2:
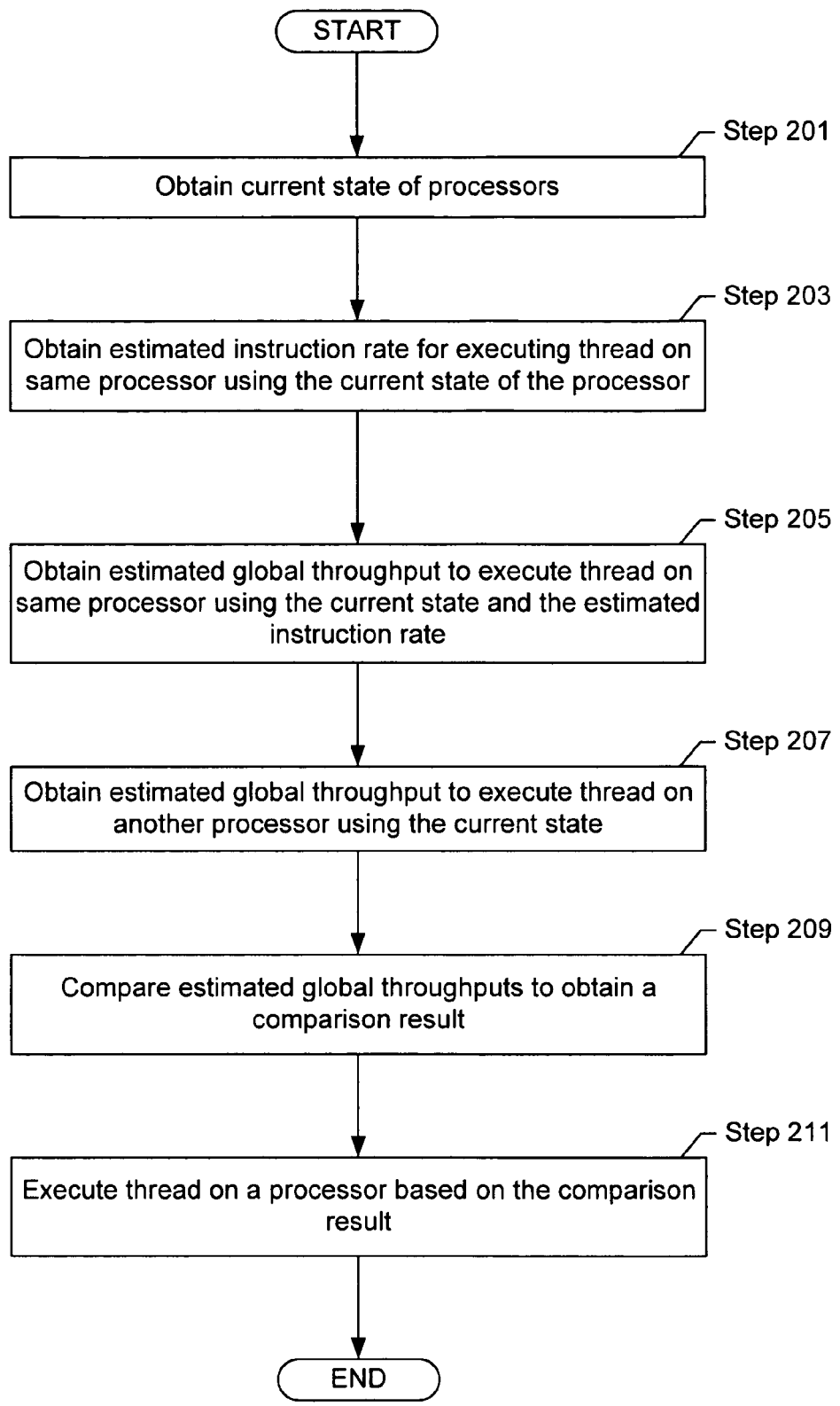
FIGS. 2 and 3A-3B show a flowchart of a method for scheduling a thread in accordance with one or more embodiments of the invention.

FIG. 2 shows a flowchart of a general method for scheduling a thread in accordance with one or more embodiments of the invention. The thread may correspond to a newly executable thread that has previously executed on one of the processors. Alternatively, the thread may be currently executing (i.e., by actually executing or by residing in the thread queue) on one of the processors. If the processor executes more threads than other processors, then the scheduler may initiate migrating threads to other processors.

Initially, the current state of the processors is obtained (Step 201). Obtaining the state of the processor may be performed by accessing the processor and obtaining performance data. Specifically, the state variables that are used by the estimated instruction rate function are gathered. Performance data, such as instruction rate, number of useful instructions may be accessed by the processor, the last time a thread was executed, and other such data that may be used to obtain the values of the state variables may be gathered and maintained by the processor as part of the kernel performance statistics. For example, a separate thread that only gathers performance information may execute on the processor. Data regarding the number of threads that are new to the processor, the number of threads that the processor is executing, and other such data may be maintained, for example, by the scheduler and/or the processor.

Once the current state of the processors are identified, then an estimated instruction rate for executing the thread on the same processor is obtained using an estimated instruction rate function and the current state of the processor (Step 203). Specifically, the estimated instruction rate function may used to estimate the rate of useful instructions. The estimated instruction rate function may be initially approximated by gathering data while observing the processor. For example, after continually gathering data, the appropriate parameters and state variables used to calculate the estimated instruction rate function (i.e., the state variables that affect the rate of useful instructions) may be identified and a regression analysis (e.g., linear regression) may be performed on the gathered data. Based on the regression analysis, the estimated instruction rate function may be approximated.

After approximating the estimated instruction rate function, the appropriate state variables may be identified from the state information and used to calculate the estimated instruction rate function. For example, if the appropriate state variables are the state variables of the state of the cache, the number of threads in the queue of the processor, the number of newly executable threads that entered the processor since the last migration decision (i.e., threads that do not have a cache investment in the processor), and the execution rate of useful instructions, then the appropriate state variables may be modified to reflect an additional thread (i.e., the thread for which a decision is being made) and used to obtain an estimated instruction rate for executing the thread on the same processor.

In addition to the appropriate state variables of the thread queue, the state variables that describe the state of the cache may be used to obtain the estimated instruction rate for the processor. Specifically, the state variables describing the state of the cache may be estimated based on the time elapsed since the last time that the thread executed on the processor and observed.

Continuing with FIG. 2, after obtaining the estimated instruction rate function, the estimated global throughput to execute the thread on the same processor is calculated using the current states and the estimated instruction rate (Step 205). In one or more embodiments of the invention, the estimated total global throughput may be obtained for each processor (i.e., a secondary processor) which did not have the thread. Obtaining the estimated total global throughput may be performed by identifying a secondary processor which did not execute the thread and calculating an estimated instruction rate. The estimated instruction rate for the secondary processor may be calculated by estimating the future instruction rate of the processor given the processors current state. Further, the state variables that are used to describe to the processor's current state evolve over time. Specifically, after observing the system, a determination may be made regarding which state variables affect the future instruction rate. Using the current state with the state variables, the estimated instruction rate function may be estimated and the estimated instruction rate for the secondary processor may be calculated. Next, the sum of the estimated instruction rates for each processor assuming the same processor executes the thread may be calculated to obtain the estimated global throughput.

Also, the estimated global throughput to execute the thread on another processor (i.e., another instance of secondary processor) is calculated using the current states (Step 207). Specifically, the estimated instruction rate function may be used to calculate an estimated future instruction rate of the same processor without the thread and to calculate the estimated future instruction rate of the secondary processor with the thread. By summing the resulting estimated instruction rates, the estimated global throughput to execute the thread on the secondary processor is obtained. In addition to the summing the resulting estimated instruction rates, a load balancing parameter may also be added to obtain the estimated global throughput. Specifically, the load balancing parameter may include a reward for evenly distributing the threads. Accordingly, the load balancing parameter may correspond to a constant, a function that takes into account the difference between the number of threads executing on each processor, etc.

Once the estimated global throughputs are obtained, then the estimated global throughputs are compared to obtain a comparison result (Step 209). Specifically, the comparison result specifies which processor to execute the thread. More specifically, if executing the thread on the same processor results in a higher estimated global throughput, then the comparison result specifies that the thread should execute on the same processor. Alternatively, if executing the thread on another processor results in a higher total global throughput, then the comparison result specifies that the thread should execute on another processor.

Several different performance statistics may be used as the estimated global throughput. For example, the estimated global throughput may represent an estimate for the number of threads that are processed, the average execution time for each thread, the number of total memory accesses required for each thread, etc. Accordingly, a high or low estimated global throughput may be more desirable depending on what the estimated global throughput represents.

Once the comparison result is calculated then the thread is executed on the processor based on the comparison result (Step 211). At this stage, the thread is scheduled to execute on the processor. For example, the thread may be migrated over to the processor using technique known in the art such as transferring the program counter and/or set in the thread queue of the processor, etc. After scheduling the thread on the processor, the processor executes the thread and the thread performs an operation on the processor. For example, the operation that is performed may be to output a result to an output device (e.g., a computer monitor) move data in the form of bits from one location to another, store data into memory, develop an intermediate result that is used by other threads, adjust a mechanical object (e.g., a robot), etc.

Figure 3A:
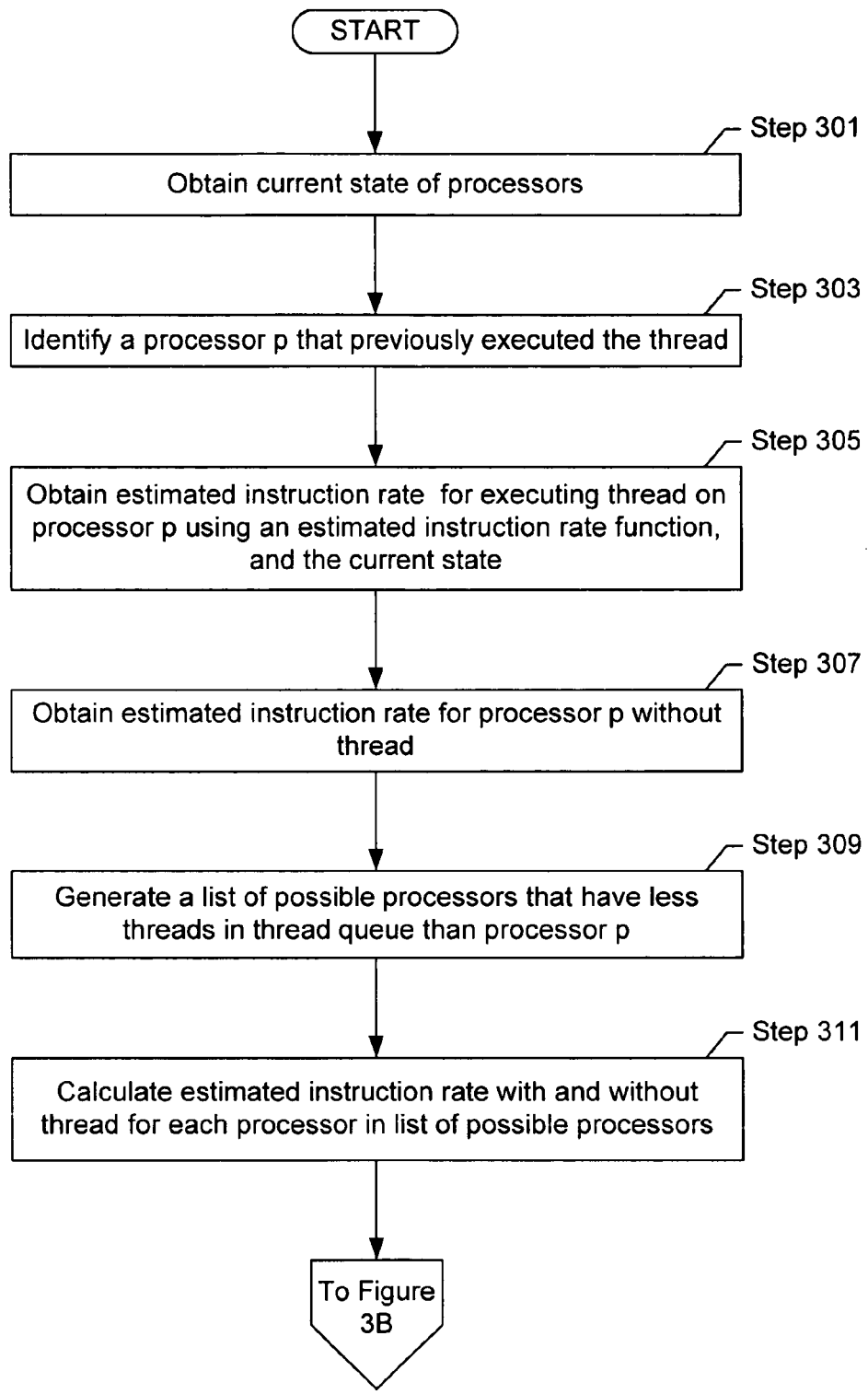
Figure 3B:
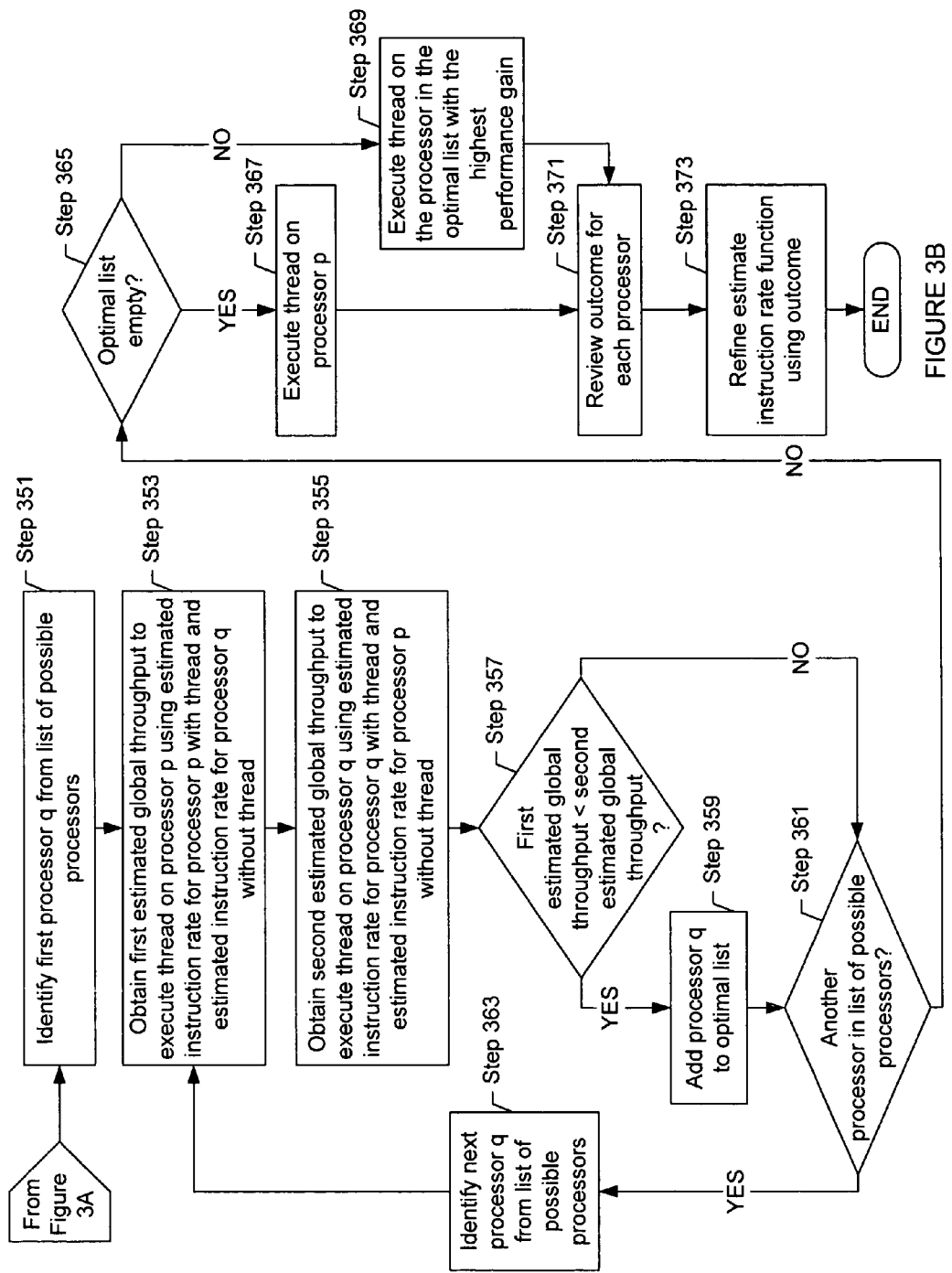

FIGS. 3A-3B show a flowchart of a method for scheduling a thread in accordance with one or more embodiments of the invention. Specifically, FIGS. 3A-3B show a flowchart of a method for considering multiple processors to execute the thread in accordance with one or more embodiments of the invention. Starting with FIG. 3A, initially, the current state of the processors is obtained (Step 301). Obtaining the current state of the processors may be performed as described above. Further, a processor that previously executed the thread ("processor p") is identified (Step 303). Identifying processor p may be performed by ascertaining which processor executed the thread.

Next, an estimated instruction rate is obtained for executing the thread on processor p using the estimated instruction rate function and the current state of the processor (Step 305). Specifically, the estimated instruction rate function for executing the thread on the same processor is calculated with the assumption that processor p is executing the thread. Also, an estimated instruction rate is obtained for processor p without the thread (Step 307). At this stage, the estimated instruction rate function is calculated for processor p using the assumption that the thread will not execute on processor p to obtain a future instruction rate. Alternatively, rather than obtaining the estimated instruction rate through calculations, a table may be used that identifies estimated future instruction rates based on the state of the processor.

Further, a list of possible processors that have fewer threads in the thread queue than processor p is generated (Step 309). Generating the list of possible processors may be performed by accessing the current states of the processors. Processors that have fewer threads in the thread queue than processor p are added to the list.

Once the list of possible processors is generated, then an estimated instruction rate with and without the thread is calculated for each processor in the list of possible processors (Step 311). Specifically, the estimated instruction rate is calculated for each processor using the assumption that the processor will execute the thread. Additionally, the estimated instruction rate function is calculated for each processor using the assumption that the processor will not execute the thread. Calculating the estimated instruction rate function using the assumption that a processor will not execute the thread may include performing actual calculations or using the previous instruction rate that is obtained from the current status as the estimated instruction rate (i.e., using the assumption that the estimated instruction rate does not change).

Advancing to FIG. 3B, a first processor q from the list of possible processors is identified (Step 351). In one or more embodiments of the invention, the identified first processor may correspond to virtually any processor in the list of possible processors. For notational purposes, the identified may be named processor q.

Once processor q is identified, the first estimated global throughput is obtained (Step 353). The first estimated global throughput represents the scenario in which processor p executes the thread and processor q does not execute the thread. Thus, obtaining the first estimated global throughput may be performed by summing the estimated instruction rate for processor p to execute the thread with the estimated instruction rate result for processor q under the assumption that processor q does not execute the thread.

Also, the second estimated global throughput is obtained (Step 355). The second estimated global throughput represents the scenario in which processor p does not execute the thread and processor q executes the thread. Accordingly, obtaining the second estimated global throughput may be performed by summing the estimated instruction rate for processor p to not execute the thread and for processor q to execute the thread. At this stage, a load balancing reward may be added to the result.

After obtaining the first and second estimated global throughputs, a determination is made whether the first estimated global throughput is less than the second estimated global throughput (Step 367). While FIG. 3B describes a higher estimated global throughput as preferable, if alternatively a lower estimated global throughput is more optimal, then the determination is whether the first estimated global throughput is greater than the second estimated global throughput.

Continuing with FIG. 3B, if the first estimated global throughput is less than the second estimated global throughput, then the processor q is added to an optimal list (Step 359). Specifically, because a higher estimated global throughput is more desirable in the embodiment shown, if the first estimated global throughput is less than the second estimated global throughput, then executing the thread on processor q is more desirable. Accordingly, processor q is added to the optimal list. In addition, the amount difference or the estimated instruction rate for executing the thread by processor q may also be added to the optimal list.

Rather than creating an optimal list, the performance of processor q with the thread may be compared with the performance of the current optimal processor. If the performance of processor q is greater, then processor q replaces the current optimal processor as the new optimal processor.

Continuing with FIG. 3B, regardless of which estimated global throughput is greater, a determination is made whether another processor exists in the list of possible processors (Step 361). Specifically, a determination is made whether another processor exists in the list of possible processors that have not been examined. If another processor exists in the list of possible processors, then the next processor is identified from the list of possible processors (Step 363). Specifically, the next processor is set as the new processor q and the method repeats for the new processor q by obtaining the first estimated global throughput.

If, alternatively, another processor does not exist in the list of possible processors, then a determination is made whether the optimal list is empty (Step 365). If the optimal list is empty, then the same processor that previously executed the thread results in a higher estimated global throughput. Specifically, the effect of the cache investment on performance attained by executing the thread on the same processor and the estimated instruction rates overcomes executing the thread on a different processor. Accordingly, the thread is executed on processor p (Step 367).

Alternatively, if the optimal list is not empty, then it is more advantageous to execute the thread on a different processor. Accordingly, the thread is executed on the processor in the optimal list that has the highest performance gain (Step 369). At this stage, the optimal list may be examined to identify the processor with the highest estimated global throughput or with the highest estimated instruction rate with the thread. The thread is then migrated to the identified processor using techniques known in the art.

After or while executing the thread, the outcome for each processor is reviewed (Step 371). Specifically, the states of each processor are obtained to determine how the decision of which processor to execute the thread affected the global throughput.

Next, the estimated instruction rate function is refined using the outcome (Step 373). Specifically, by using the techniques of reinforcement learning, the functions may be updated to reflect the actual outcome. Refining the estimated instruction rate function may involve changing the calculations in the function, changing the parameters used in each function (i.e., the multipliers of the state variables), adjusting the state variables that describe the processor's current state, simplifying the function, etc. Further, rather than refining the estimated instruction rate function at each decision of which processor to execute a thread, the outcomes may be obtained and used to update the functions on a periodic basis.

Figure 4:
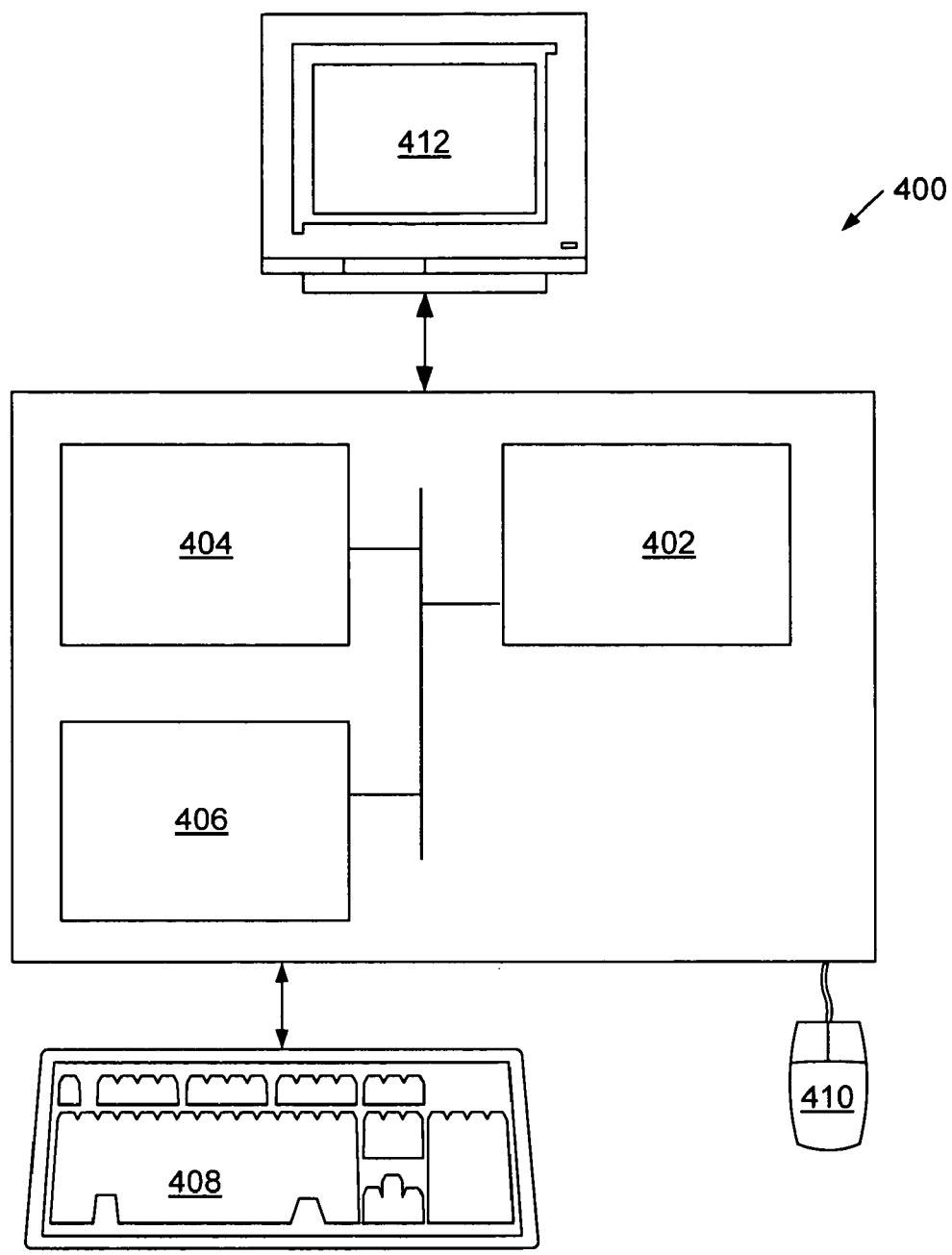
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., processor p, processor q, scheduler, memory, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention identify and use relevant information when determining the processor that should execute the thread. Specifically, by using the estimated instruction rate function and the estimated global throughput function, embodiments of the invention take into account the effect that different state variables have on the performance of the system when scheduling a thread. Moreover, by including state variable that describe the state of the cache, the amount of cache investment that a thread has with a specific cache is recognized and used in the determination of whether to execute the thread on the same processor.

Further, by using reinforcement learning to learn the estimated instruction rate function and the estimated global throughput, the decisions to execute the thread may be more accurate and reflective of the actual state of the system. Specifically, by refining the different functions, the decision of which processor to execute the thread is improved over time.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for scheduling a thread on a plurality of processors comprising:
    obtaining a first state of a first processor in the plurality of processors and a second state of a second processor in the plurality of processors, wherein the thread is last executed on the first processor, and wherein the first state of the first processor comprises a state of a cache of the first processor;
    obtaining a first estimated instruction rate to execute the thread on the first processor using an estimated instruction rate function and the first state;
    obtaining a second estimated instruction rate for the second processor using the estimated instruction rate function and the second state;
    summing the second estimated instruction rate and the first estimated instruction rate to obtain a first estimated global throughput for executing the thread on the first processor;
    obtaining a second estimated global throughput for executing the thread on the second processor using the second state;
    comparing the first estimated global throughput with the second estimated global throughput to obtain a comparison result; and
    executing the thread, based on the comparison result, on one selected from a group consisting of the first processor and the second processor, wherein the thread performs an operation on one of the plurality of processors.

2. The method of claim 1, wherein the state of the cache comprises a state variable that identifies an amount of cache used by currently executing threads of the first processor.

3. The method of claim 1, wherein the estimated instruction rate function is refined using reinforcement learning.

4. The method of claim 1, wherein the first state of the first processor comprises a state of a thread queue of the first processor.

5. The method of claim 4, wherein the state of the thread queue of the first processor comprises at least one selected from a group consisting of a number of threads in a processor queue, a number of newly executed threads in a processor queue of the first processor, and an execution rate of instructions by the first processor.

6. The method of claim 5, wherein instructions for memory access are excluded from the execution rate of instructions.

7. A method for scheduling a thread on a plurality of processors comprising:
   obtaining a first state of a first processor in the plurality of processors and a second state of a second processor in the plurality of processors, wherein the thread is last executed on the first processor, and wherein the first state of the first processor comprises a state of a cache of the first processor;
   obtaining a first estimated instruction rate to execute the thread on the first processor using an estimated instruction rate function and the first state;
   obtaining a first estimated global throughput for executing the thread on the first processor using the first estimated instruction rate and the second state;
   obtaining a second estimated instruction rate for the first processor using the estimated instruction rate function and the first state;
   obtaining an estimated state of the second processor using the second state, wherein the estimated state reflects the presence of an additional thread on the second processor;
   obtaining a third estimated instruction rate for the second processor using the estimated instruction rate function and the estimated state;
   summing the second estimated instruction rate and the third estimated instruction rate to obtain a second estimated global throughput for executing the thread on the second processor;
   comparing the first estimated global throughput with the second estimated global throughput to obtain a comparison result; and
   executing the thread, based on the comparison result, on one selected from a group consisting of the first processor and the second processor, wherein the thread performs an operation on one of the plurality of processors.

8. The method of claim 7, wherein the second estimated global throughput comprises a total of the first estimated instruction rate, the second estimated instruction rate, and a load balancing parameter.

9. A system for scheduling a thread comprising:
   a plurality of processors for executing the thread; and
   a scheduler configured to:
     obtain a first state of a first processor in the plurality of processors and a second state of a second processor in the plurality of processors, wherein the thread is last executed on the first processor, and wherein the first state of the first processor comprises a state of a cache of the first processor;
     obtain a first estimated instruction rate to execute the thread on the first processor using an estimated instruction rate function and the first state;
     obtain a second estimated instruction rate for the second processor using the estimated instruction rate function and the second state;
     sum the second estimated instruction rate and the first estimated instruction rate to obtain a first estimated global throughput;
     obtain a second estimated global throughput for executing the thread on the second processor using the second state;
     compare the first estimated global throughput with the second estimated global throughput to obtain a comparison result; and
     execute the thread, based on the comparison result, on one selected from the group consisting of the first processor and the second processor, wherein the thread performs an operation on one of the plurality of processors.

10. The system of claim 9, wherein the state of the cache comprises a state variable that identifies an amount of cache used by currently executing threads of the first processor.

11. The system of claim 9, wherein a state of a thread queue of the first processor comprises at least one selected from a group consisting of a number of threads in a processor queue, a number of newly executed threads in a processor queue of the first processor, and an execution rate of instructions by the first processor, and wherein instructions for memory access are excluded from the execution rate of instructions.

12. The system of claim 9, wherein obtaining the first estimated global throughput and the second estimated global throughput uses an estimated instruction rate function.

13. The system of claim 9, wherein the estimated instruction rate function is refined using reinforcement learning.

14. The system of claim 9, wherein obtaining the second estimated global throughput comprises:
   obtaining the second estimated instruction rate for the first processor using the estimated instruction rate function and the first state;
   obtaining an estimated state of the second processor using the second state, wherein the estimated state reflects a presence of an additional thread on the second processor;
   obtaining a third estimated instruction rate for the second processor using the estimated instruction rate function and the estimated state; and
   summing the second estimated instruction rate and the third estimated instruction rate to obtain the second estimated global throughput.

15. A distributed computer system for scheduling a thread on a plurality of processors comprising:
   a plurality of nodes for:
     obtaining a first state of a first processor in the plurality of processors and a second state of a second processor in the plurality of processors, wherein the thread is last executed on the first processor, and wherein the first state of the first processor comprises a state of a cache of the first processor;
     obtaining a first estimated instruction rate to execute the thread on the first processor using an estimated instruction rate function and the first state;
     obtaining a second estimated instruction rate for the second processor using the estimated instruction rate function and the second state;
     summing the second estimated instruction rate and the first estimated instruction rate to obtain a first estimated global throughput;

obtaining a second estimated global throughput for executing the thread on the second processor using the second state;

comparing the first estimated global throughput with the second estimated global throughput to obtain a comparison result; and executing the thread, based on the comparison result, on one selected from a group consisting of the first processor and the second processor, wherein the thread performs an operation on one of the plurality of processors, wherein each node of the plurality of nodes comprises a hardware processor.

16. The distributed computer system of claim 15, wherein the state of the cache comprises a state variable that identifies an amount of cache used by currently executing threads of the first processor.

17. The distributed computer system of claim 15, wherein the estimated instruction rate function is refined using reinforcement learning.

18. The distributed computer system of claim 15, wherein the first state of the first processor comprises a state of a thread queue of the first processor.

* * * * *